(12) United States Patent
Schnabel

(10) Patent No.: US 6,356,609 B1
(45) Date of Patent: Mar. 12, 2002

(54) METHOD OF TRANSMITTING A CODED CONTROL SIGNAL BETWEEN ASYNCHRONOUS ASSEMBLIES

(75) Inventor: Dirk Schnabel, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/210,228

(22) Filed: Dec. 11, 1998

(30) Foreign Application Priority Data

Dec. 11, 1997 (DE) .......................................... 197 55 146

(51) Int. Cl.[7] .......................... H03K 5/00; H04L 25/30
(52) U.S. Cl. ...................... 375/370; 375/354; 375/355; 370/386
(58) Field of Search ................................ 375/354, 268, 375/293, 357, 310, 295, 370, 355, 232, 236, 386; 370/241, 242, 236, 232, 235, 339

(56) References Cited

U.S. PATENT DOCUMENTS 6,049,882 A  *  4/2000  Paver ......................... 713/322
6,055,620 A  *  4/2000  Paver et al. ................. 712/201
6,084,934 A  *  7/2000  Garcia et al. ............... 375/370
6,134,285 A  * 10/2000  Lo ............................. 375/355

FOREIGN PATENT DOCUMENTS

DE           31 18 621 A1     11/1982

* cited by examiner

*Primary Examiner*—Chi Pham
*Assistant Examiner*—Dung X Nguyen
(74) *Attorney, Agent, or Firm*—Bell, Boyd & Lloyd LLC

(57) ABSTRACT

A method wherein an activated control signal is transmitted between two assemblies, which are driven asynchronously relative to one another, as a code signal which is switched between different conditions with a prescribed rate. In the receiving unit, the code signal is classified as an activated control signal only if an expected number of changes of condition are registered during a prescribed time period. There is thus a high degree of security against a misinterpretation of the control signal.

8 Claims, 1 Drawing Sheet

METHOD OF TRANSMITTING A CODED CONTROL SIGNAL BETWEEN ASYNCHRONOUS ASSEMBLIES

BACKGROUND OF THE INVENTION

1. Field of the Invention

The present invention relates to a method for transmitting a control signal, which has two-condition capability, between assemblies which are driven asynchronously relative to one another wherein the transmission has a high degree of security against misinterpretation of the control signal.

2. Description of the Prior Art

Control signals between asynchronously running digital assemblies have exactly one active level (logical 0 or 1). Such control signals can be easily unintentionally activated by errors such as a defective drive or a short. This results in an undesirable error propagation which must be avoided at all times in complex systems such as the switching computer of a telecommunications switching installation.

Since asynchronous assemblies run with different clocks and different phases, a synchronous coding is not possible. In conventional systems, only a static control signal with one active level is used. This can result in the misinterpretation of an apparent control signal, particularly given the failure of the operating voltage of an assembly or the dismantling of the electrical connections of an assembly, such as in the retraction of the assembly from its connecting plug.

It is therefore an object of the present invention to propose a method for forwarding a control signal between asynchronously driven assemblies in which there is a high degree of security against a misinterpretation of the control signal.

SUMMARY OF THE INVENTION

Such object is achieved in a method wherein the inventive coding, which is suitable for asynchronous assemblies, avoids the abovementioned error and its propagation and thereby sharply increases the reliability. A realization of the inventive method includes an extensive insensitivity to jitter in the sequence of the change of condition of the coding signal and does not require any additional hardware outlay compared to the conventional solution.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
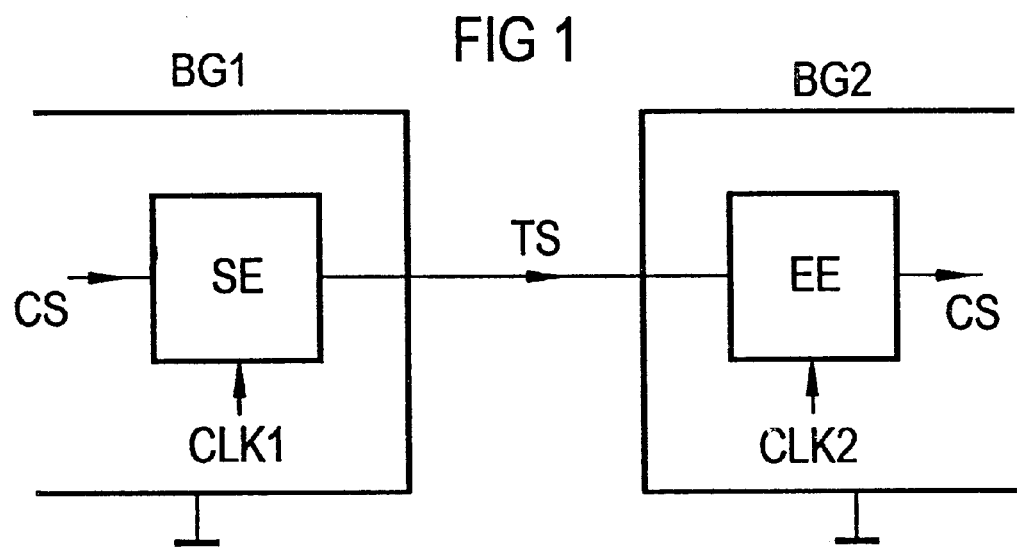
FIG. 1 shows a schematic circuit arrangement of the system to which the present invention is directed.

FIG. 1 depicts a first assembly BG1 and a second assembly BG2 which may consist of two assemblies which are driven asynchronously, yet microsynchronously relative to one another; such as assemblies which are redundant relative to one another and which include a microprocessor, respectively. The first assembly BG1 is driven with a first clock signal CLK1, and the second assembly BG2 is driven with a second clock signal CLK2.

In the embodiment depicted in FIG. 1, a control signal CS is emitted from the first assembly BG1 to the second assembly BG2. The control signal is fed to a transmitting unit SE. The transmitting unit SE emits a code signal TS (Transmission Signal) at the output side given an adjacent activated control signal wherein the code signal TS is switched between different conditions according to a first frequency. The changeover can occur between ternary conditions, but it preferably occurs between binary conditions. The code signal TS is received in the second assembly BG2 by a receiving unit EE. In the receiving unit, the code signal TS is scanned in a sequence which is at least twice as high as the rate with which the condition of the code signal TS changes. The number of signal transitions of the control signal CS is registered during a prescribed number of clockings; e.g., eight. If the number of signal transitions is equal to half the defined number of clockings, the receiving unit emits an activated control signal CS at the output side.

Signal changes which occur with, at most, half the frequency of the scanning frequency of the receiving unit are thus created. The receiving unit uses its internal clock and takes over the emitted signals. The changes of condition of the control signal CS (the 1→0 and 0→1 changes) which occur in a defined time period are now counted with a simple circuit.

For example, the two assemblies BG1, BG2 run with the same frequency, but with different phases. In addition, the clocks are loaded with a tolerance. A simple coding is a sequence 11001100 . . . . The receiving unit counts the signal transitions over a defined number of clock pulses (in the example, 4 transitions must be counted given 8 clock pulses).

Figure 2:
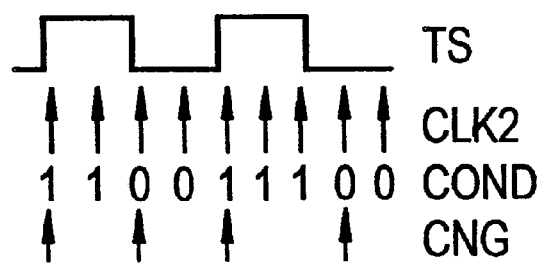
FIG. 2 shows individual signal conditions in the schematic circuit arrangement of FIG. 1.

FIG. 2 shows the code signal TS, which is clocked in the receiving unit EE according to the second clock signal CLK2; i.e., it is clocked with each change of condition of the clock signal, for example, as is illustrated by long arrows. In the clockings, the conditions of the code signal TS, which are reproduced in the condition line, are registered. The changes, reproduced in the CNG (for: change) line, of the conditions of the code signal TS are determined from the registered conditions of the code signal TS, as illustrated by short arrows.

In the example according to FIG. 2, a sequence 11001100 is scanned with a clock which can be easily offset. The received sequence is 110011100, thus deviating from the transmitted sequence. However, there are exactly four transitions given eight scan values. The control signal is thus recognized with certainty.

Given an error as described above, the signal takes on a continuous 1 or 0, signal changes are not decoded, and the control signal CS is not active. Other errors such as startup processes at the transmitting unit create an accumulation of accidentally distributed disturbances which are potentially recognized in the receiving unit as valid signal impulses. However, it is possible to individually increase reliability by means of the length of the coded control signal.

For the sake of clarification, the method of the present invention has been described for the case in which the control signal CS is scanned in the receiving unit with a somewhat higher sequence than that which equals twice the sequence with which the control signal CS changes its condition in the transmitting unit.

The principle underlying the subject of the present invention is generally based on the equation:

$$\Psi_{ab} = (\Psi_{wechsel} + \Delta\Psi)/n \text{ (for } n=2, 3, 4 \ldots )$$

whereby $\Psi_{ab}$ designates the sequence with which the control signal CS is scanned in the receiving unit, $\Psi_{wechsel}$ designates the sequence with which the control signal CS changes its condition in the transmitting unit, and $\Delta\Psi$ designates an addition of, for example, 10 percent of the sequence of changes of condition of the control signal CS.

The control signal CS is thus generally scanned in the reception with a somewhat smaller sequence than n times the sequence with which the control signal CS changes its condition in the transmission. An activated control signal CS is registered if the changes of condition of the control signal CS, which are standardized at n, are larger than one during an observation period.

Although the present invention has been described with reference to specific embodiments, those of skill in the art will recognize that changes may be made thereto without departing from the scope of the invention as set forth in the hereafter appended claims.

I claim as my invention:

1. A method for transmitting a control signal, which nay be in one of two binary conditions between a first assembly and a second assembly which are driven asynchronously relative to one another wherein the transmission has a high degree of security against a misinterpretation of the control signal, the method comprising the steps of:

forwarding the control signal from the first assembly to the second assembly;

clocking the control signal in the second assembly in a sequence which is smaller than n times the sequence with which the control signal is switched between a first and a second condition in the first assembly;

registering a number of signal transmissions of the control signal in the second assembly during a defined number of clockings; and determining an activated control signal if the number of the signal transitions associated with the n-fold is greater than one.

2. A method for transmitting a control signal, which may be in one of two binary conditions between first and second assemblies which are driven asynchronously relative to one another wherein the transmission has a high degree of security against misinterpretation of the control signal, the method comprising the steps of:

forwarding the control signal from the first assembly to the second assembly;

switching the control signal in the first assembly between the first and the second conditions in a frequency which is nearly equal to one-half the frequency with which the second assembly clocks the control signal;

registering a number of signal transitions of the control signal in the second assembly during a defined number of clockings; and determining an activated control signal if the number of signal transitions is equal to one-half the defined number of clockings.

3. A method for transmitting a control signal as claimed in claim 1, wherein the control signal is clocked in the second assembly with a frequency which is twice the frequency of the clock signal with which the second assembly is driven.

4. A method for transmitting a control signal as claimed in claim 2, wherein the control signal is clocked in the second assembly with a frequency which is twice the frequency of the clock signal with which the second assembly is driven.

5. A method for transmitting a control signal as claimed in claim 1, wherein a greater number of required signal transitions is prescribed for determining the activated control signal so as to increase the security against a misinterpretation of the control signal.

6. A method for transmitting a control signal as claimed in claim 2, wherein a greater number of required signal transitions is prescribed for determining the activated control signal so as to increase the security against a misinterpretation of the control signal.

7. A method for transmitting a control signal as claimed in claim 3, wherein a greater number of required signal transitions is prescribed for determining the activated control signal so as to increase the security against a misinterpretation of the control signal.

8. A method for transmitting a control signal as claimed in claim 4, wherein a greater number of required signal transitions is prescribed for determining the activated control signal so as to increase the security against a misinterpretation of the control signal.

* * * * *